United States Patent
Buhrke

(10) Patent No.: US 10,344,808 B2
(45) Date of Patent: Jul. 9, 2019

(54) SYNCHRONIZING DEVICE

(71) Applicant: Deere & Company, Moline, IL (US)

(72) Inventor: Frank Buhrke, Birkenau (DE)

(73) Assignee: DEERE & COMPANY, Moline, IL (US)

( * ) Notice: Subject to any disclaimer, the term of this patent is extended or adjusted under 35 U.S.C. 154(b) by 160 days.

(21) Appl. No.: 15/298,867

(22) Filed: Oct. 20, 2016

(65) Prior Publication Data

US 2017/0114840 A1    Apr. 27, 2017

(30) Foreign Application Priority Data

Oct. 23, 2015 (DE) .......................... 10 2015 220 718

(51) Int. Cl.
F16D 23/06 (2006.01)

(52) U.S. Cl.
CPC ......... *F16D 23/0612* (2013.01); *F16D 23/06* (2013.01); *F16D 2023/0618* (2013.01); *F16D 2023/0637* (2013.01)

(58) Field of Classification Search
CPC ........... F16D 23/0612; F16D 2011/002; F16D 23/06; F16D 23/08
See application file for complete search history.

(56) References Cited

U.S. PATENT DOCUMENTS

| 1,935,965 A | 11/1933 | Wahlberg | |
| 2015/0027255 A1* | 1/2015 | Kume | F16D 11/14 74/339 |

FOREIGN PATENT DOCUMENTS

| DE | 2936009 A1 | 3/1981 |
| DE | 4404093 C1 | 5/1995 |
| DE | 10136429 C1 | 10/2002 |
| DE | 102007010307 B3 | 6/2008 |
| DE | 102012020291 A1 | 4/2014 |
| DE | 102013106846 A1 | 7/2014 |

OTHER PUBLICATIONS

Campara et al. Machine Translation of DE102012020291. Apr. 17, 2014. Espacenet. (Year: 2014).*
German Search Report in foreign counterpart application No. 102015220718.8 dated Jun. 1, 2016 (8 pages).
European Search Report in counterpart European Application No. 16194657.9, categorizing and applying cited document(s) (dated Apr. 4, 2017) (7 pages).

* cited by examiner

*Primary Examiner* — Jacob S. Scott
*Assistant Examiner* — Lori Wu

(57) ABSTRACT

A synchronizing device, for a vehicle gearbox, with a synchronizer body which can be mounted rotationally fixedly on an axial shaft, and a shift sleeve which is connected rotationally fixedly to the synchronizer body and can be moved axially along an outer periphery of the synchronizer body and which, to perform a synchronizing process, can be brought from a neutral position into rotationally fixed engagement in a first shift phase with an axially displaceable synchronizer ring and in a second shift phase with a clutch body adjacent to the synchronizer ring. During the first shift phase, the synchronizer ring can be moved in the direction of the adjacent clutch body by the shift sleeve using pressure pads arranged axially displaceably in the synchronizer body, and hence can be brought into frictional engagement with the adjacent clutch body for the purpose of pre-synchronization.

20 Claims, 2 Drawing Sheets

SYNCHRONIZING DEVICE

CROSS-REFERENCE TO RELATED APPLICATIONS

Pursuant to 35 USC § 119, this application claims the benefit of and priority to German patent application no. 102015220718.8, filed on Oct. 23, 2015, which is hereby incorporated by reference herein in its entirety.

FIELD OF THE DISCLOSURE

The present disclosure concerns a synchronizing device used in vehicle gearboxes for shifting between gears.

BACKGROUND

In general, the shift sleeve is moved axially by a shift fork actuated by external force, the fork-shaped end of which engages in an actuating groove running around the shift sleeve. The shift fork is actuated by an electric, hydraulic or pneumatic actuator. Since the fork-shaped end is mounted inside the actuating groove with a certain degree of shift play, which is typically of the order of 1 to 3 millimeters, it is possible that because of external force influences, the shift sleeve is deflected out of its central neutral position along the synchronizer body and thus the synchronizer ring is brought into contact with the adjacent clutch body. This can lead to undesirable premature wear of the friction faces formed on the clutch body and synchronizer ring.

SUMMARY

The object is therefore to specify a synchronizing device which is improved in terms of reliability and durability.

This object is achieved by a synchronizing device with the features of one or more embodiments disclosed herein The synchronizing device, in particular for a vehicle gearbox, comprises a synchronizer body which can be mounted rotationally fixedly on an axial shaft, and a shift sleeve which is connected rotationally fixedly to the synchronizer body and can be moved axially along an outer periphery of the synchronizer body and which, to perform a synchronizing process, can be brought from a neutral position into rotationally fixed engagement in a first shift phase with an axially displaceable synchronizer ring and in a second shift phase with a clutch body adjacent to the synchronizer ring, wherein during the first shift phase the synchronizer ring can be moved in the direction of the adjacent clutch body by the shift sleeve using pressure pads arranged axially displaceably in the synchronizer body and hence can be brought into frictional engagement with the adjacent clutch body for the purpose of pre-synchronization. According to the disclosure, the shift sleeve is locked by a detent device arranged in the synchronizer body such that a defined fixing force must be overcome in order to move the shift sleeve out of the neutral position.

In this way, the shift sleeve is reliably centred in its neutral position independently of a shift play existing between the fork-shaped end of the shift fork and the actuating groove of the shift sleeve, so that a deflection of the shift sleeve caused by external force influences, and an associated undesirable contact of the friction faces of the synchronizer body and the synchronizer ring, are securely prevented.

Advantageous refinements of the synchronizing device according to the disclosure arise from the claims.

In one embodiment, the detent device has a pressure spring and a detent ball engaging in a recess of the shift sleeve in the neutral position, wherein the pressure spring is guided in a radial bore, slotted towards the outside, inside the synchronizer body. The formation of the radial bore slotted towards the outside allows better accessibility of the pressure spring or detent ball for the purpose of assembling the synchronizing device. A recess provided along the inner periphery of the shift sleeve may in particular have a conical or cylindrical form so that the shift ball lies against the outer wall only at points. This leads to a particularly secure locking of the detent ball within the recess.

In contrast to the provision of a full bore which can lead locally to comparatively small wall thicknesses (which can cause problems on performance of a hardening process) in the end faces of the synchronizer body, a residual wall thickness suitable for the hardening process used can be maintained by corresponding dimensioning of the width of the slot. The width of the slot is in particular matched to the diameter of the pressure spring used, so that this is supported in the synchronizer body along a partial circumference of the radial bore and hence guided reliably therein.

With a view to an even distribution of the fixing and actuating forces exerted on the shift sleeve and synchronizer body, it is possible that in total three detent devices and three pressure pads are arranged alternately along the periphery of the synchronizer body, distributed with an angular spacing of 60°.

The pressure pads may be coupled with the shift sleeve via further detent devices. Each of the further detent devices in turn comprises a pressure spring and a detent ball engaging in a recess of the shift sleeve. The further detent devices transmit a movement occurring on the shift sleeve onto the pressure pads such that the pressure pads follow the movement of the shift sleeve until a predefined shift point is reached, but when the predefined shift point is passed, are decoupled by overcoming the ball engagement.

For this, the pressure springs extend through radial bores formed in the pressure pads, wherein each of the pressure springs is mounted with a radially inner end in the synchronizer body and lies with a radially outer end on the detent ball, pressing this against the shift sleeve or the recess formed along its inner periphery.

Here it is possible that the detent devices and the further detent devices comprise pressure springs and/or detent balls with matching dimensions. The use of the same parts is not only more economic but excludes in advance incorrect assembly of the synchronizing device because of confusion of components.

BRIEF DESCRIPTION OF THE DRAWINGS

The synchronizing device according to the disclosure is explained in more detail below with reference to the enclosed drawings. Parts with corresponding or similar function carry the same reference numerals. The drawings show.

DETAILED DESCRIPTION

Figure 1:
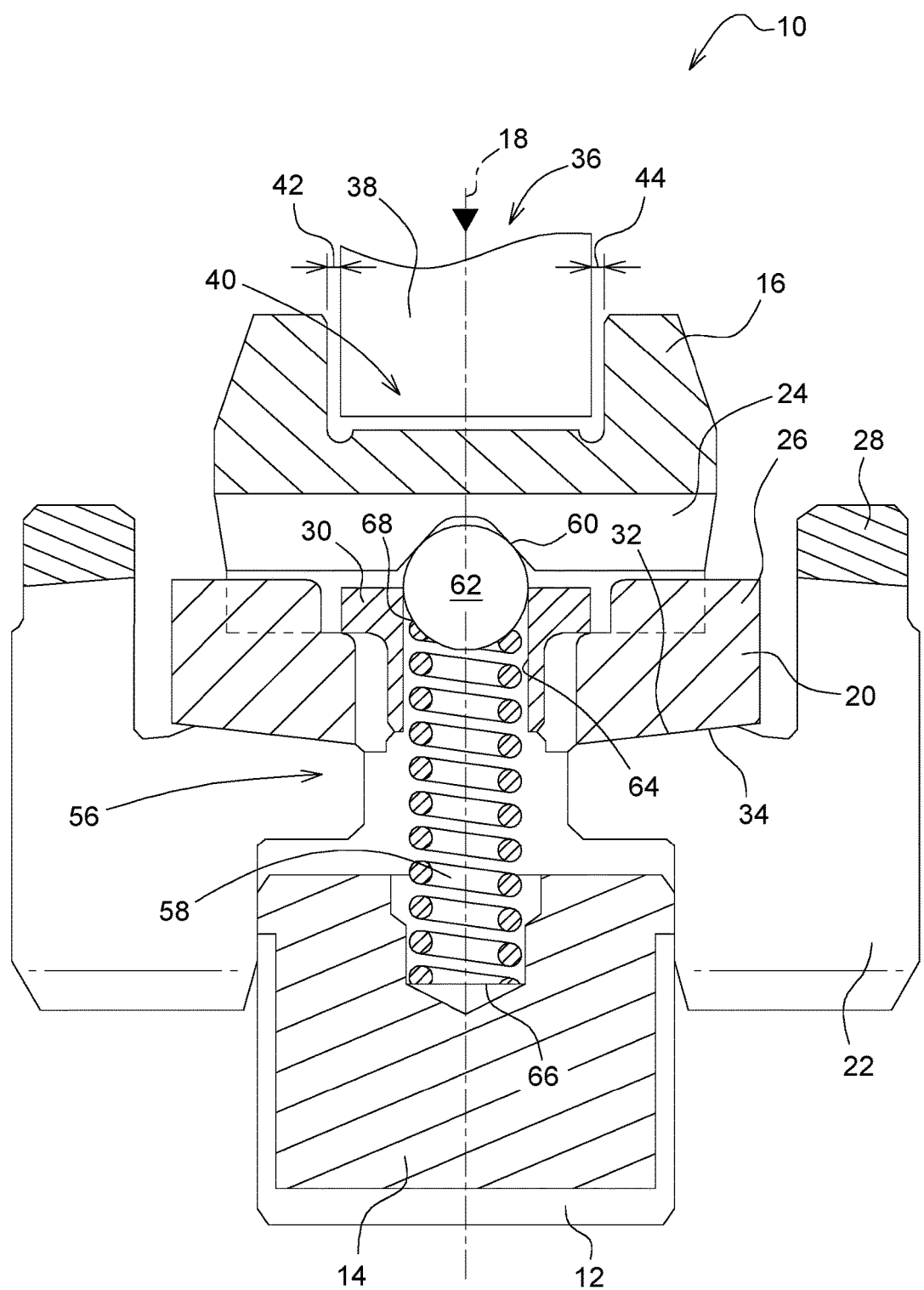
FIG. 1 a partial view, shown in cross-section, of an exemplary embodiment of the synchronizing device according to the disclosure for a vehicle gearbox, and FIG. 2 a section view of a synchronizer body contained in the synchronizing device according to the disclosure, with a shift sleeve and a plurality of detent devices.
Figure 2:
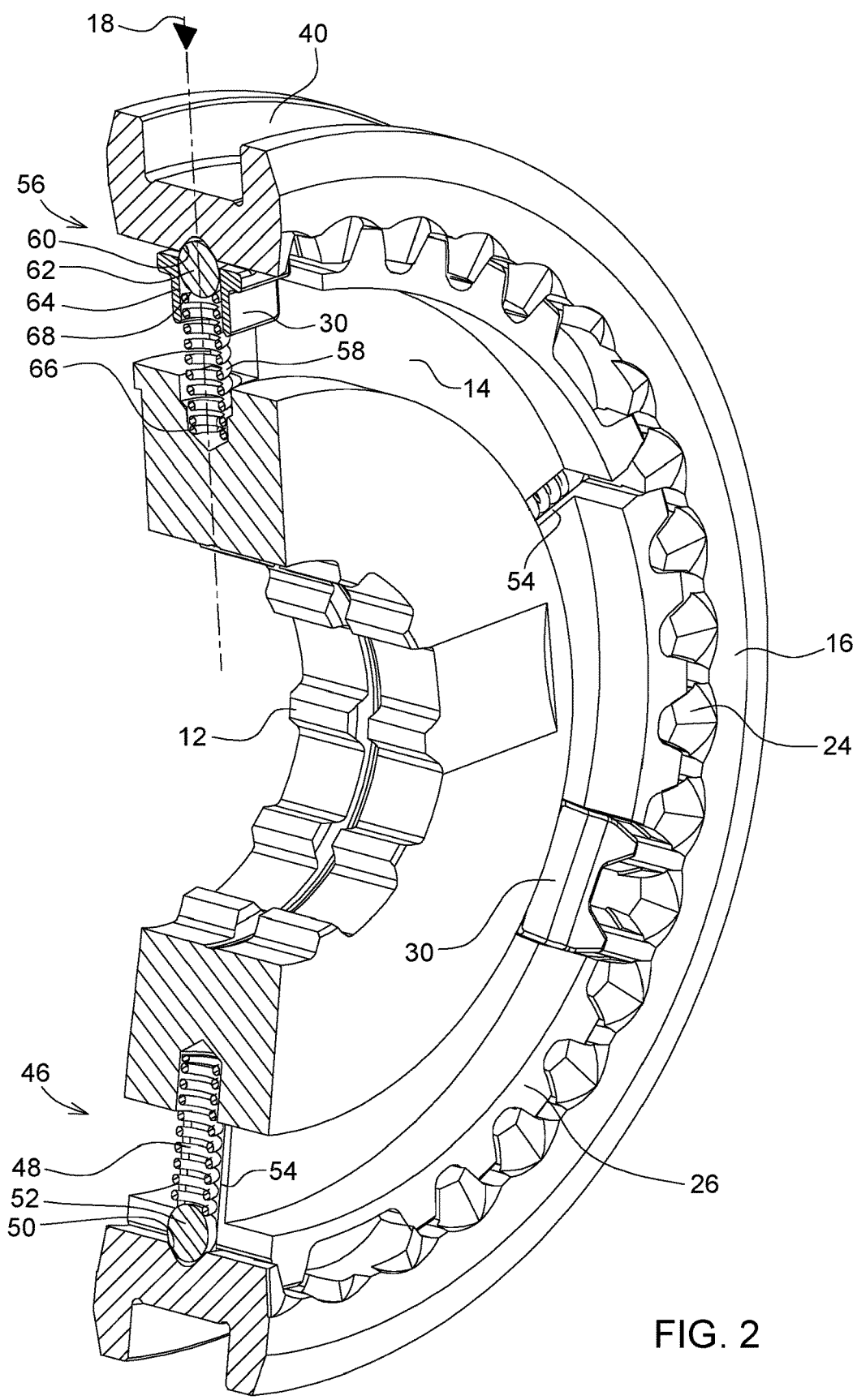

FIGS. 1 and 2 show different section views of an exemplary embodiment of the synchronizing device according to the disclosure.

According to the example, the synchronizing device 10 is used for shifting between two gears in a vehicle gearbox (not shown), wherein on engagement of the gears, the synchronizing process described below is performed in order to compensate for possible differences in rotation speeds. For the sake of simplicity, the description of the synchronizing process is restricted to just one of the two gears. Corresponding statements apply to the other gear.

The synchronizing device 10 comprises a synchronizer body 14 mounted rotationally fixedly on an axial shaft (not shown) by a toothing 12, and a shift sleeve 16 which is connected rotationally fixedly to the synchronizer body 14 and can move axially along an outer periphery of the synchronizer body 14, and which, starting from a neutral position 18, can be brought into rotationally fixed engagement in a first shift phase with an axially displaceable synchronizer ring 20 and in a second shift phase with a clutch body 22 adjacent to the synchronizer ring 20. An inner toothing 24 of the shift sleeve 16 and an outer toothing 26 of the synchronizer body 14 intermesh in order, on completion of the synchronizing process, to transmit a rotation of the axial shaft to the clutch body 22 provided with the corresponding outer toothing 28.

During the first shift phase, the synchronizer ring 20 is moved in the direction of the adjacent clutch body 22 by the shift sleeve 16 using pressure pads 30 arranged axially displaceably in the synchronizer body 14, and thus brought into frictional engagement with the adjacent clutch body 22 for the purpose of pre-synchronization. The frictional engagement is created by conical friction faces 32, 34 formed on the clutch body 22 and synchronizer ring 20. Blocking teeth (not shown) prevent further movement of the shift sleeve 16 until the difference in rotation speed has been eliminated. When this is the case, the shift sleeve 16 can be moved further in the subsequent second shift phase by engagement with the outer toothing 28 provided on the clutch body 22. The synchronizing process is thus complete.

The shift sleeve 16 is moved axially by a shift fork 36 actuated by external forces, the fork-shaped end 38 of which engages in an actuating groove 40 running around the shift sleeve 16. The fork-shaped end 38 is mounted inside the actuating groove 40 with a certain degree of shift play 42, 44. This is typically of the order of 1 to 3 millimeters. The shift fork 36 is actuated by an electric, hydraulic or pneumatic actuator (not shown).

Furthermore, the shift sleeve 16 is locked in its neutral position 18 by a plurality of detent devices 46 arranged in the synchronizer body 14, such that a defined fixing force must be overcome in order to move the shift sleeve 16 out of the neutral position 18 (see FIG. 2). To this end, each of the detent devices 46 has a pressure spring 48 and a detent ball 52 engaging in a recess 50 of the shift sleeve 16 in the neutral position 18. The pressure spring 48 is guided in a radial bore 54, slotted towards the outside, inside the synchronizer body 14. The recess 50 formed along the inner periphery of the shift sleeve 16 has a conical or cylindrical form.

In this way, the shift sleeve 16 is reliably centred in its neutral position 18 independently of a shift play 42, 44 existing between the fork-shaped end 38 of the shift fork 36 and the actuating groove 40 of the shift sleeve 16, so that a deflection of the shift sleeve 16 caused by external force influences, and an associated undesirable contact of the conical friction faces 32, 34 of the synchronizer ring 20 and clutch body 22, are securely prevented.

According to the example, in total three detent devices 46 and three pressure pads 30 are arranged alternately along the periphery of the synchronizer body 14, distributed with an even angular spacing of 60°.

As evident in particular from the depiction in FIG. 2, the pressure pads 30 are coupled with the shift sleeve 16 via further detent devices 56. Each of the further detent devices 56 comprises a pressure spring 58 and a detent ball 62 engaging in a recess 60 of the shift sleeve 16. The further detent devices 56 transmit a movement occurring at the shift sleeve 16 to the pressure pads 30, such that the pressure pads 30 follow the movement of the shift sleeve 16 until a predefined shift point is reached, but after the predefined shift point is passed, are decoupled by overcoming the ball engagement. For this, the pressure springs 58 extend through radial bores 64 formed in the pressure pads 30, wherein each of the pressure springs 60 is mounted with a radially inner end 66 in the synchronizer body 14 and lies with a radially outer end 68 on the detent ball 62, pressing this against the shift sleeve 16 or the recess 60 formed along its inner periphery. With a view to the economic and confusion-safe use of identical components, the detent devices 46 and also the further detent devices 56 comprise pressure springs 48, 58 and/or detent balls 52, 62 with matching dimensions.

The invention claimed is:

1. A synchronizing device, for a vehicle gearbox, comprising:
   a synchronizer body which can be mounted rotationally fixedly on an axial shaft, and
   a shift sleeve which is connected rotationally fixedly to the synchronizer body and can be moved axially along an outer periphery of the synchronizer body and which, to perform a synchronizing process, can be brought from a neutral position into rotationally fixed engagement in a first shift phase with an axially displaceable synchronizer ring having a radially outer surface, and in a second shift phase with a clutch body adjacent to the synchronizer ring,
   wherein during the first shift phase the synchronizer ring can be moved in the direction of the adjacent clutch body by the shift sleeve using pressure pads arranged axially displaceably in the synchronizer body, and hence can be brought into frictional engagement with the adjacent clutch body for the purpose of pre-synchronization, wherein each of the pressure pads comprises a radially inner surface configured to abut the radially outer surface of the synchronizer ring,
   wherein the shift sleeve is locked by a detent device arranged in the synchronizer body such that a defined fixing force must be overcome in order to move the shift sleeve out of the neutral position, and
   wherein the pressure pads are axially coupled with the shift sleeve via further detent devices to follow axial movement of the shift sleeve via detent engagement until a predefined shift point is reached.

2. The synchronizing device of claim 1, wherein the detent device has a pressure spring and a detent ball engaging in a recess of the shift sleeve in the neutral position, wherein the pressure spring is guided in a radial bore, slotted towards the outside, inside the synchronizer body.

3. The synchronizing device of claim 1, wherein a total of three detent devices and three pressure pads are arranged alternately along the periphery of the synchronizer body, distributed with an angular spacing of 60°.

4. The synchronizing device of claim 1, wherein the detent devices and the further detent devices comprise pressure springs and detent balls with matching dimensions.

5. The synchronizing device of claim 1, wherein the shift sleeve comprises a recess formed along an inner periphery of the shift sleeve, the recess engaging the further detent devices until a predefined shift point when the pressure pads are decoupled from the further detent devices.

6. The synchronizing device of claim 5, wherein the further detent devices comprise a pressure spring and a detent ball engaging in the recess formed along the inner periphery of the shift sleeve.

7. The synchronizing device of claim 6, wherein the pressure spring is mounted with a radially inner end on the synchronizer body.

8. The synchronizing device of claim 1, wherein the shift sleeve is configured to shift between engagement with two gears in the vehicle gearbox.

9. A synchronizing device for a vehicle gearbox, the device comprising:
   a synchronizer body rotationally fixed on an axial shaft and having an outer periphery; and
   a shift sleeve rotationally fixed to the synchronizer body and axially movable along the outer periphery of the synchronizer body, the shift sleeve being configured to perform a synchronizing process by moving from a neutral position into a rotationally fixed engagement, in a first shift phase, with a synchronizer ring configured for axial displacement and having a radially outer surface and, in a second shift phase, configured for rotationally fixed engagement with a clutch body disposed adjacent to the synchronizer ring,
   wherein, during the first shift phase, the synchronizer ring is movable in a direction toward the clutch body by the shift sleeve using a plurality of pressure pads configured to be axially displaceable in the synchronizer body such that the synchronizer ring is axially displaced into frictional engagement with the clutch body for pre-synchronization,
   wherein the shift sleeve is lockable by a detent device arranged in the synchronizer body such that a defined fixing force must be overcome in order to move the shift sleeve out of the neutral position,
   wherein the plurality of pressure pads is axially coupled with the shift sleeve to follow axial movement of the shift sleeve via detent engagement until a predefined shift point is reached;
   wherein each of the plurality of pressure pads comprises a radially inner surface configured to abut the radially outer surface of the synchronizer ring, and
   wherein, when the predefined shift point is passed, the pressure pads overcome detent engagement such that the following of axial movement of the shift sleeve by the pressure pads ends.

10. The synchronizing device of claim 9, wherein the detent device has a pressure spring and a detent ball engaging in a recess of the shift sleeve in the neutral position, wherein the pressure spring is guided in a radial bore, slotted towards an outside location of the synchronizer body, inside the synchronizer body.

11. The synchronizing device of claim 9, wherein the plurality of pressure pads comprises three pressure pads, and three detent devices and the three pressure pads are arranged alternately along the periphery of the synchronizer body, distributed with an angular spacing of 60°.

12. The synchronizing device of claim 9, further comprising further detent devices providing the detent engagement between the pressure pads and the shift sleeve.

13. The synchronizing device of claim 12, wherein each of the detent devices and each of the further detent devices comprises a pressure spring and a detent ball having matching dimensions.

14. The synchronizing device of claim 12, wherein the shift sleeve comprises a recess formed along an inner periphery of the shift sleeve, the recess engaging the further detent devices until a predefined shift point when the following of axial movement of the shift sleeve by the pressure pads ends.

15. The synchronizing device of claim 14, wherein the further detent devices comprise a pressure spring and a detent ball engaging in the recess formed along the inner periphery of the shift sleeve.

16. The synchronizing device of claim 9, wherein the shift sleeve is configured to shift between engagement with two gears in the vehicle gearbox.

17. A synchronizing device for a vehicle gearbox, the device comprising:
   a synchronizer body rotationally fixed on an axial shaft and having an outer periphery;
   a shift sleeve rotationally fixed to the synchronizer body and axially movable along the outer periphery of the synchronizer body;
   a synchronizer ring configured for axial displacement and having a radially outer surface;
   a clutch body disposed adjacent to the synchronizer ring;
   a plurality of first detent devices angularly spaced in the synchronizer body;
   a plurality of pressure pads angularly spaced in the synchronizer body, each having a radially inner surface configured to abut the radially outer surface of the synchronizer ring, and configured for axial displacement;
   a plurality of second detent devices coupling the plurality of pressure pads to the shift sleeve;
   wherein, in a first shift phase of a synchronizing process, the shift sleeve is configured to move from a neutral position, out of engagement with the plurality of first detent devices, and into a rotationally fixed engagement with the synchronizer ring, and
   wherein, in the first shift phase of the synchronizing process, the shift sleeve uses the plurality of pressure pads to move the synchronizer ring in a direction toward the clutch body such that the synchronizer ring is axially displaced into frictional engagement with the clutch body,
   wherein the plurality of pressure pads follow movement of the shift sleeve before the following of the movement of the shift sleeve ends at a predetermined shift point when the shift sleeve overcomes engagement with the plurality of second detent devices, and
   wherein, in a second shift phase of the synchronizing process, the shift sleeve moves into rotationally fixed engagement with the clutch body.

18. The device of claim 17, further comprising a second clutch body disposed adjacent to the synchronizer ring opposite the clutch body.

19. The synchronizing device of claim 17, wherein the shift sleeve is configured to shift between engagement with two gears in the vehicle gearbox.

20. The synchronizing device of claim 17, wherein the shift sleeve comprises a recess formed along an inner periphery of the shift sleeve, the recess engaging the plurality of second detent devices until the predetermined shift point when the shift sleeve overcomes engagement with the plurality of second detent devices.

* * * * *